United States Patent [19]

Suzuki et al.

[11] 4,427,265
[45] Jan. 24, 1984

[54] DIFFUSION PLATE

[75] Inventors: Takashi Suzuki; Kiyoshi Iizuka, both of Yokohama; Keiji Ohtaka, Tokyo; Hidemasa Mizutani, Kawasaki, all of Japan

[73] Assignee: Canon Kabushiki Kaisha, Tokyo, Japan

[21] Appl. No.: 275,406

[22] Filed: Jun. 18, 1981

[30] Foreign Application Priority Data

Jun. 27, 1980 [JP] Japan ................... 55-88029
Jun. 27, 1980 [JP] Japan ................... 55-88031

[51] Int. Cl.$^3$ .............................................. G02B 5/02
[52] U.S. Cl. ...................................... 350/321; 350/167
[58] Field of Search ............... 350/321, 167, 320, 322, 350/128, 127

[56] References Cited

U.S. PATENT DOCUMENTS 2,275,602  3/1942  Beck et al. ........................ 350/431
4,336,978  6/1982  Suzuki .

Primary Examiner—Jon W. Henry
Attorney, Agent, or Firm—Fitzpatrick, Cella, Harper & Scinto

[57] ABSTRACT

This application relates to a diffusion plate having microlens-like curved surfaces of a size of 10 to several tens of $\mu$m arranged periodically in two dimensions on the surface of the substrate thereof. Curved surfaces are formed between the microlens-like curved surfaces. Further, irregularly arranged minute concave and/or convex surfaces are formed on the microlens-like curved surfaces.

4 Claims, 13 Drawing Figures

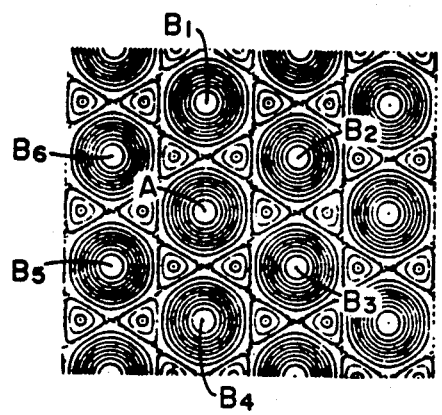
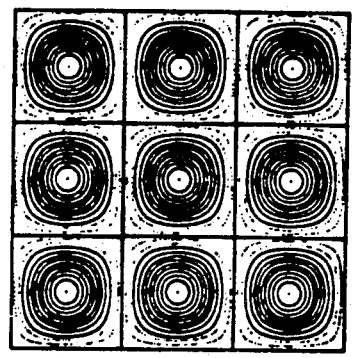
FIG. 2
PRIOR ART
FIG. 3
PRIOR ART
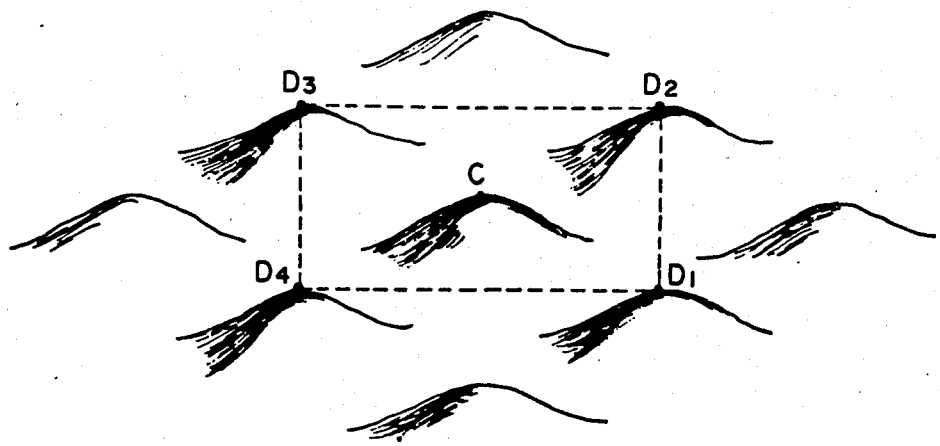
FIG. 4
PRIOR ART

DIFFUSION PLATE

BACKGROUND OF THE INVENTION

1. Field of the Invention

This invention relates to a diffusion plate, and more particularly to a diffusion plate applicable to the focusing screen of a single lens reflex camera or a cinecamera.

2. Description of the Prior Art

Frosted glass has been used for the focusing screen of a camera. However, the focusing screen of frosted glass has suffered from difficulties in brightness. Thus, applicant has proposed in U.S. application Ser. No. 105,884, filed Dec. 20, 1979, now U.S. Pat. No. 4,336,978 a method of making a diffusion plate having microlens-like curved surfaces arranged periodically in two dimensions on the surface of the substrate thereof, and further having curved surfaces formed between the microlens-like curved surfaces.

When the diffusion plate made by this manufacturing method has been incorporated into a camera, it has been found that even if the aperture is stopped down, the marginal portion thereof does not become dark and the diffusion plate provides a bright focusing screen in which no speckle is seen as in frosted glass. However, this focusing screen basically has a diffraction grating structure (periodical structure) and therefore, (1) when there is a periodical structure in an object to be photographed, and (2) when the pitch (usually 30-50μ) of the concentric circles of a Fresnel lens lying on the reflection side surface of the focusing screen is similar to the pitch of the diffraction grating structure of the focusing screen, there are created moiré stripes which make the view-finder image difficult to view.

The diffusion plate of the present invention alleviates the influence of the periodical structure of the microlens by minute concavo-covexity irregularly arranged on the microlens-like curved surfaces.

Focusing screens having minute concavo-convexity provided on the microlens-like curved surfaces are already commercially available. However, no curved surfaces are formed between the microlenses of such a focusing screen.

SUMMARY OF THE INVENTION

It is therefore an object of the present invention to provide a diffusion plate having microlens-like curved surfaces arranged periodically in two dimensions on the substrate thereof, and having curved surfaces formed between the microlens-like curved surfaces, and further having irregular minute concavo-convexity provided on the microlens-like curved surfaces.

The invention will become fully apparent from the following detailed description of some embodiments thereof taken in conjunction with the accompanying drawings.

BRIEF DESCRIPTION OF THE DRAWINGS

FIG. 2 shows a diffusion plate made by the method of FIG. 1.

FIGS. 3 and 4 show diffusion plates made by modifications of the FIG. 1 method.

DESCRIPTION OF THE PREFERRED EMBODIMENTS

Before describing embodiments of the present invention, the method of making a whole surface microlens-like diffusion plate disclosed in the aforementioned U.S. Application Ser. No. 105,884 will be described with reference to FIG. 1.

Figure 1:
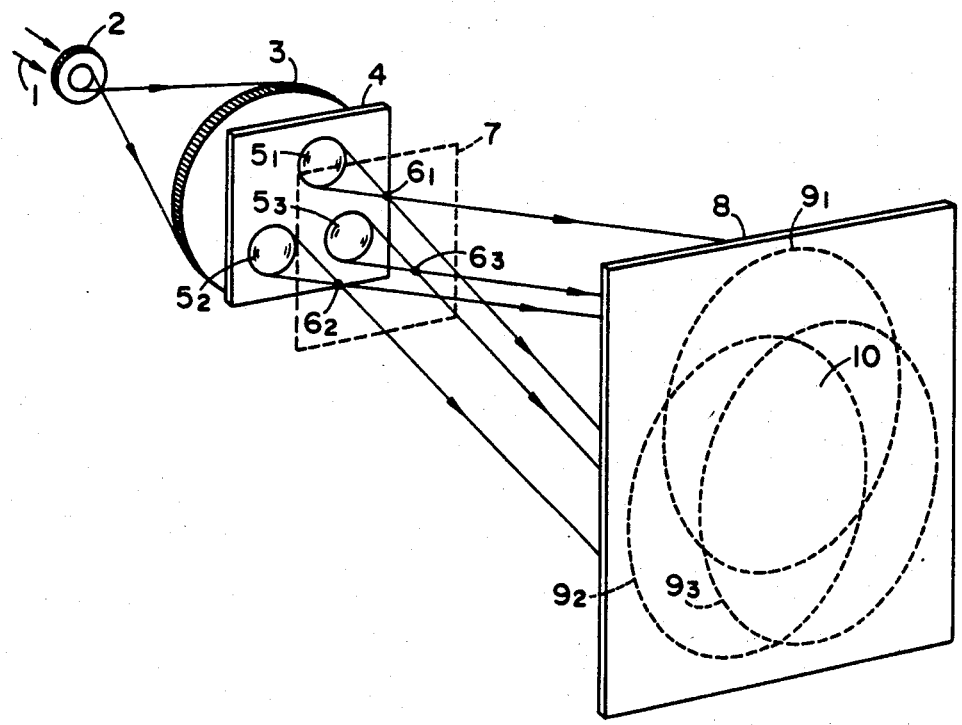
FIG. 1 illustrates the optical method of making a diffusion plate according to the prior art.

In FIG. 1, reference numeral 1 designates a laser light beam reference numerals 2 and 3 denote a beam expander system, reference numeral 4 designates a lens holder holding three lenses $5_1$-$5_3$, and reference numerals $6_1$-$6_3$ denote three actual spot light sources created by three convex lenses. In some cases, at the position of the three actual spot light sources, there may be provided a filter 7 having tiny openings slightly larger than the size of the spot light sources in order to eliminate any noise caused by dust or the like sticking to the lenses. Designated by 8 is a pattern recording member, and in the portion 10 on the surface thereof where the expanses $9_1$-$9_3$ of the light beams from the spot light sources overlap one another, there is created an interference fringe of the three light beams. Where the three spot light sources $6_1$-$6_3$ are located substantially at the vertices of an equilateral triangle, this interference pattern has a two-dimensional periodicity. By recording and developing this interference pattern on a photoresist or by recording it on a dry-plate and processing it through any one of various bleaching methods known in the field of holography, there may be formed a concavo-convex pattern corresponding to the interference pattern.

FIG. 2 is an enlarged view of a diffusion plate made by the method shown in FIG. 1 and contours are indicated in FIG. 2. As is apparent from FIG. 2, a microlens-like convex surface is formed periodically in two dimensions on the surface of the diffusion plate made by the method of FIG. 1 and smooth concave surfaces are formed between the microlenses. If the peaks $B_1$-$B_6$ of six mountains surrounding the peak A of the central mountain are linked together, there is formed approximately a hexagon. The peak-to-peak distance, e.g., $AB_1$, is determined in accordance with the spacings between the three pin-holes $6_1$-$6_3$ in FIG. 1 and the distance from the pin-holes to the surface 8 of the recording material, and the order of 10μ-40μ can be easily controlled. A size of the order of 10μ to several tens of microns is preferable in order to keep the performance of the diffusion plate.

The three lenses $5_1$-$5_3$ of FIG. 1 are made into four lenses and, accordingly, the convergent light sources $6_1$-$6_3$ are made into four. Moreover, if they form a square, there are obtained interference fringes (contours) as shown in FIG. 3 on the recording surface, and there is obtained in a concavo-convex surface as shown in FIG. 4 by a process similar to the previously described process. In FIG. 4, if the four peaks $D_1$-$D_4$ surrounding the central peak C are linked together, there is formed approximately a square. $D_1$-$D_4$ can be made into a rectangle or a lozenge depending on the manner of arrangement of the four pin-holes.

Where the recording sensitive material is a holography dry-plate, such concavo-convexity is recorded as the concavo-convexity of a gelatin surface, and where photoresist is used, the concavo-convexity of the photoresist surface is recorded.

By forming a mold through electrocasting with this as the negative and molding it into plastic, mass production of focusing screens becomes possible.

The diffusion plate of the present invention is formed with irregular minute concavo-convexity, i.e., concave and/or convex surfaces; in addition to such concavo-convex surfaces, i.e., concave and/or convex surfaces. This minute concavo-convexity may be formed by either an optical method or a mechanical method.

An example of the formation of the minute concavo-convexity by the use of an optical method will be described with reference to FIG. 5.

Figure 5:
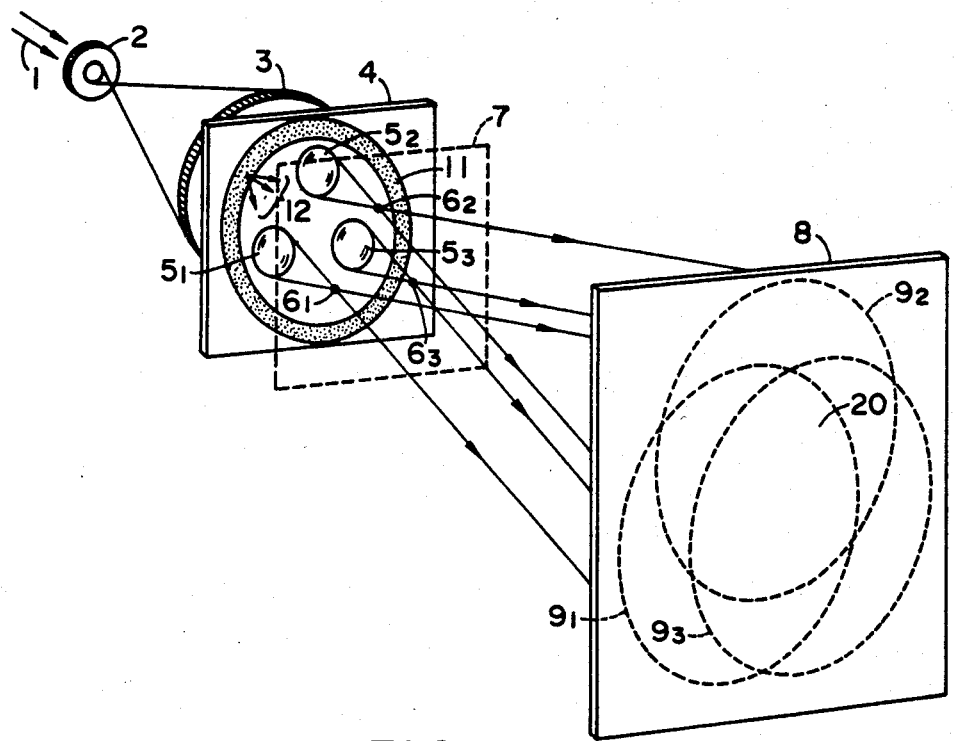
FIG. 5 illustrates the method of making a diffusion plate according to the present invention.

In FIG. 5, reference numeral 1 designates a laser light beam, reference numerals 2 and 3 denote a beam expander system, reference numeral 4 designates a lens holder holding three lenses $5_1$–$5_3$, and references numerals $6_1$–$6_3$ denote three actual spot light sources created by three convex lenses. In some cases, at the position of the three actual spot light sources, there may be provided a filter 7 having tiny openings slightly larger than the size of the spot light sources in order to eliminate any noise caused by dust or the like sticking to the lenses. Designated by 11 is a diffusion surface provided on the lens holder 4 for obtaining a speckle pattern, and denoted by 8 is a pattern recording member and in the portion 20 on the surface thereof where the expanses $9_1$–$9_3$ of the light beams from the spot light sources overlap one another at an angle, there is created an interference fringe synthesized by the three light beams and the diffused light 12 from the diffusion surface 11.

Figure 6:
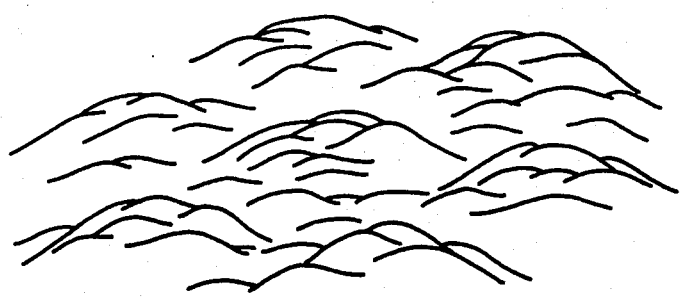
FIG. 6 shows a diffusion plate made by the method of FIG. 5.

FIG. 6 is an enlarged perspective view of a concavo-convex pattern obtained by recording on the recording member 8 an image comprising the speckle pattern by the diffused light 12 superposed on the interference fringe of the above-mentioned three light beams $9_1$, $9_2$ and $9_3$, and further processing the same by the bleaching method.

Figure 7:
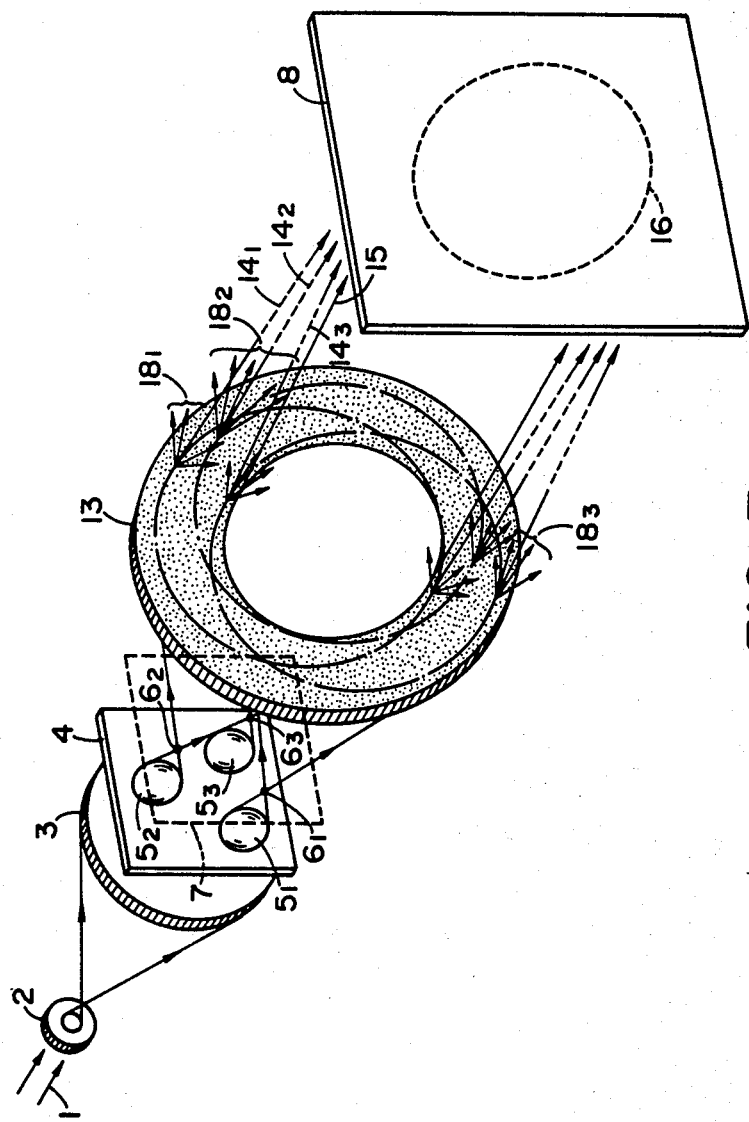
FIGS. 7 and 8 show manufacturing methods different from the method of FIG. 5.

The above-mentioned interference pattern is such that the arrangement of the microlens-like curved surfaces thereof has a two-dimensional periodicity as shown in FIG. 7 and irregular concavo-convex speckle patterns are superposed on the individual microlens-like curved surfaces.

It is desirable that there be at least two such speckle patterns for a microlens arranged periodically in two dimensions, and five or more speckle patterns are desirable as the view-finder screen of a camera.

When such an interference pattern has been recorded on a silver salt dry-plate and the intensity distribution of light has been converted into concavo-convexity distribution of gelatin layer by the well-known bleaching process, there has been obtained a whole surface microlens-like diffusion plate having irregularly arranged concavo-convexity by the speckle pattern superposed on the surface of the minute lens as shown in FIG. 7. Such a microlens concavo-convex structure can be mass-produced by the use of a well-known copying method. As the recording member 8, use may be made of photopolymer, thermoplastic, dichromated gelatin or chalcogen glass in accordance with the wavelength of the light source. Further, by the processing method for these sensitive materials, the minute periodical structure can also be made into a relief (concavo-convex) structure or an internal distribution of refractive index.

In the interference pattern generating device shown in FIG. 5, the lenses $5_1$–$5_3$ may also be concave lenses, and the light beams causing creation of the interference fringe are not limited to divergent light beams but may be convergent light beams, parallel light beams or other light beams having such a degree of aberration that they will not form an irregular period in the interference pattern.

Particularly, in the method shown in FIG. 5, strain is caused in the interference fringe by the spot light sources $6_1$–$6_3$ and therefore, where it is desired to obtain a strain-free pattern over a wide area, it is desirable to use the interference between three plane waves and diffused light. Although there is a possibility of more or less aberration coming in, the method of the next embodiment may be used to obtain three plane waves and diffused light in a simple manner.

Another embodiment of the present invention will be described with reference to FIG. 7.

In FIG. 7, reference numeral 13 designates a lens having only the central portion thereof polished and the marginal portion thereof roughly ground. A plane 7 determined by spot light sources $6_1$–$6_3$ is made coincident with the focal plane of the lens 13 and therefore, a plane wave 15 exits from the central portion of the lens 13 and diffused lights $18_1$–$18_3$ created by three light beams exit from the marginal portion of the lens 13 and enter into a light recording material 8. Thus, there is obtained a pattern in which the random structure of the speckle pattern formed by the diffused lights and the periodical structure by the plane wave overlap each other. By adjusting the spacing between lenses 2 and 3, the light beams from spot light sources $6_1$–$6_3$ can also be superposed upon one another as an irradiated area on the surface of the sensitive material with said light beams as the plane wave.

Figure 8:
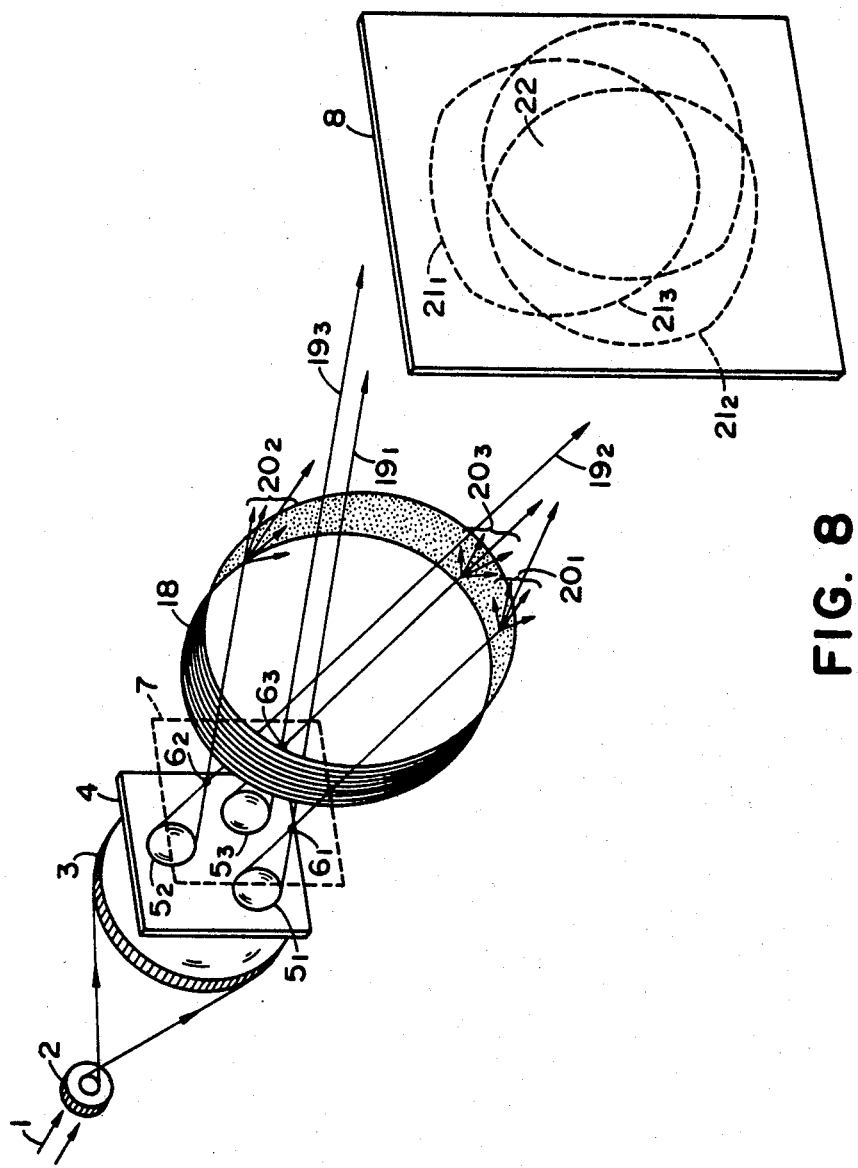

FIG. 8 shows a third embodiment of the present invention in which the roughened internal surface of a cylinder 18 is used as the diffusion surface for the formation of a speckle pattern. Thus, part of the light beams from spot light sources $6_1$, $6_2$ and $6_3$ become scattered lights $20_1$, $20_2$ and $20_3$ on the internal surface of the cylinder to form a speckle pattern.

Description has so far been made only of the method of simultaneously recording the interference fringe for forming a periodical arrangement of microlens-like curved surfaces and an irregular concavo-convex speckle pattern, but these two stages may also be effected in a time-series fashion. More specifically, the interference fringe of the microlens arrangement may first be recorded by the method shown in FIG. 1, and then the speckle pattern may be recorded by another optical system. Part of the optical system for forming the speckle pattern is shown in FIGS. 9, 10, 11 and 12.

Figure 9:
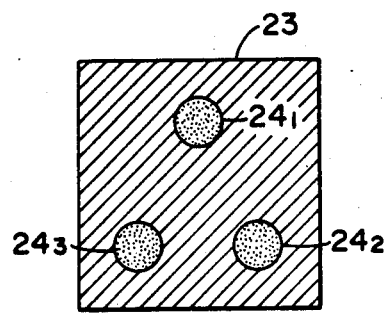
FIGS. 9 to 12 show a speckle generator.

FIG. 9 shows an example in which circular diffusion members $24_1$–$24_3$ are placed at the vertices of an equilateral triangle. Designated by 23 is a diffusion member holding jig.

Figure 10:
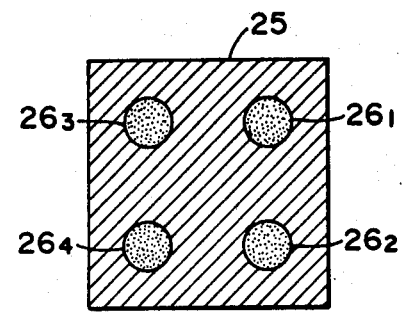
Figure 11:
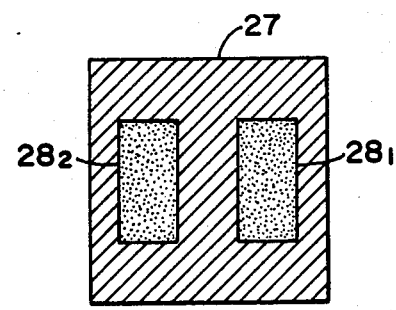

FIG. 10 shows an embodiment in which circular diffusion members $26_1$–$26_4$ are placed at the vertices of a square. Denoted by 25 is a diffusion member holding jig. FIG. 11 shows an example in which rectangular diffusion members $28_1$ and $28_2$ are disposed with a finite distance therebetween. Designated by 27 is a diffusion member holding jig.

Figure 12:
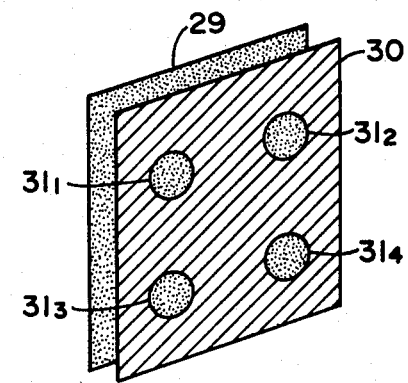

FIG. 12 shows an example in which a diffusion member 29 and a diffusion member holding jig 30 are disposed in a spaced apart relationship.

As shown, the configuration of the diffusion members may be that of diffusion members formed by a plurality of closed curves.

In the foregoing description, the light beams for forming the microlens arrangement have been shown as three, however this is not restrictive, instead a plurality of light beams may be used. Also, the optical speckle pattern for forming the irregular concavo-convexity is not restricted to the above described speckle pattern but may also be those formed by other various optical methods.

Another manufacturing method concerned with the focusing screen of the present invention is semi-mechanical. When the surface of the mold has a regular lens arrangement in which the concavo-convexity is reversed to that of FIG. 4, hard particles having a radius smaller than that of a frame inscribed on the concave surface of the mold are blown against the surface of the mold. When glass beads having a diameter of 10μ have been blown against a lens arrangement of pitch 16μ by borning, the surface of the mold shown in FIG. 3 in which the concavo-convexity is reversed has been covered with an irregular concave curved surface and, when a focusing screen has been molded by the use of such a mold, there has been obtained a surface provided with irregular minute convex surfaces.

Why the present system has been called the semi-mechanical method is that the mold having a regular lens-arranged surface has been formed with the optical method as the base.

A mold for minute fly's eye lens can also be made by directly carving a metal surface by means of a cutting tool having a spherical end, but the present system can also be used to roughen the surface thereof and in that case, the present system may be called an entirely mechanical manufacturing method.

Figure 13:
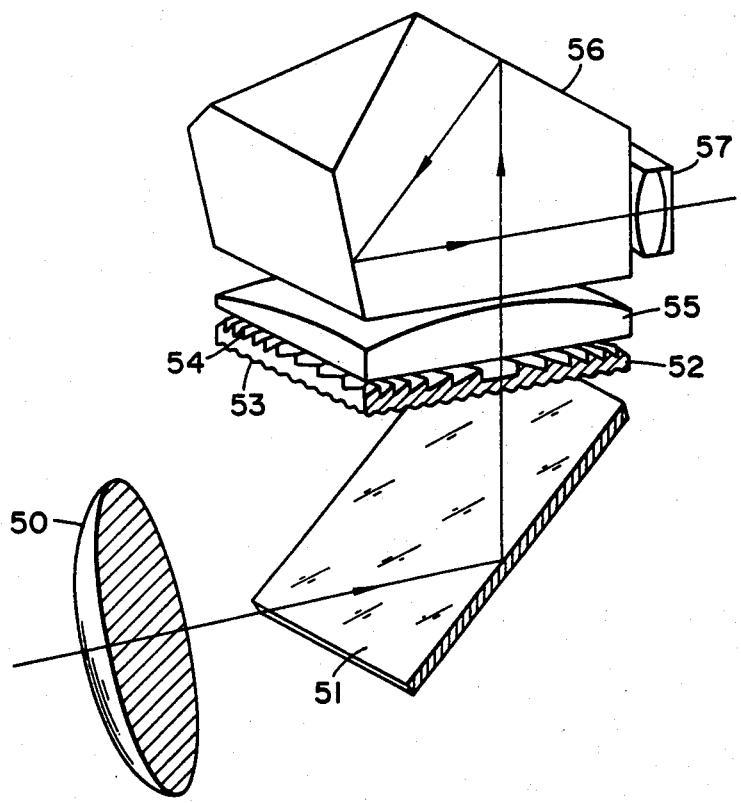
FIG. 13 shows the diffusion plate of the present invention as incorporated in a camera.

FIG. 13 shows a camera incorporating therein the diffusion plate of the present invention. In FIG. 13, reference numeral 50 designates an objective lens, and reference numeral 51 denotes a swing-up mirror. Reference numeral 52 designates a focusing screen. A diffusion surface 53 is formed on the lower surface of the focusing screen 52, and a Fresnel lens 54 is formed on the upper surface. This diffusion surface assumes the configuration as shown in FIG. 6. Reference numeral 55 designates a condenser lens, reference numeral 56 denotes a pentaprism, and reference numeral 57 designates an eyepiece.

In this camera, smooth microlens-like curved surfaces are arranged two-dimensionally on the diffusion surface 52 and the boundaries therebetween are connected by smooth curved surfaces. Therefore, the view finder is bright and even if the aperture is stopped down, no darkness will be seen. Further, since random minute concavo-convexity is formed in the regular lens arrangement surface, the quality of image obtained when it has been incorporated into the viewfinder is such that problems or moiré, spot, coloring, etc., are alleviated and particularity is not impaired.

What we claim is:

1. A diffusion plate having the following constructions formed on the surface of the substrate thereof:
    microlens-like curved surfaces of a size of the order of 10 to several tens of $\mu$m arranged regularly and two-dimensionally;
    curved surfaces between said microlens-like curved surface; and
    minute concavo-convex surfaces irregularly arranged on said microlens-like curved surfaces.

2. A diffusion plate according to claim 1, wherein said irregularly arranged concavo-convex surfaces are minute curved surfaces.

3. A diffusion plate according to claim 1, further comprising irregularly arranged concavo-convex surfaces formed on said curved surfaces between said microlens-like curved surfaces.

4. A diffusion plate having the following constructions formed on the surface of the substrate thereof:
    microlens-like curved surfaces of a size of the order of 10 to several tens of $\mu$m arranged regularly and two-dimensionally;
    curved surfaces between said microlens-like curved surfaces; and
    minute concavo-convex surfaces irregularly arranged on said microlens-like curved surfaces and on said curved surfaces.

* * * * *

UNITED STATES PATENT AND TRADEMARK OFFICE
CERTIFICATE OF CORRECTION

PATENT NO. : 4,427,265

DATED : January 24, 1984

INVENTOR(S) : TAKASHI SUZUKI, et al.

It is certified that error appears in the above-identified patent and that said Letters Patent is hereby corrected as shown below:

Column 1, line 15, after "4,336,978" insert --,which issued on June 29, 1982,--.

Column 6, line 11, after "and" insert --,--;
line 16, "or" should read --of--.

Column 6, line 25 (Claim 1), "surface" should read --surfaces--.

Signed and Sealed this

Nineteenth Day of June 1984

[SEAL]

Attest:

Attesting Officer

GERALD J. MOSSINGHOFF

Commissioner of Patents and Trademarks